United States Patent
Zhang et al.

(10) Patent No.: US 9,794,005 B2
(45) Date of Patent: Oct. 17, 2017

(54) METHODS AND DEVICES FOR MIMO TRANSMISSION

(71) Applicant: Telefonaktiebolaget L M Ericsson (publ), Stockholm (SE)

(72) Inventors: Zhang Zhang, Beijing (CN); Bo Göransson, Sollentuna (SE); Xinyu Gu, Beijing (CN); Erik Larsson, Uppsala (SE); Qingyu Miao, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 11 days.

(21) Appl. No.: 14/653,058

(22) PCT Filed: Dec. 19, 2012

(86) PCT No.: PCT/CN2012/086907
§ 371 (c)(1),
(2) Date: Jun. 17, 2015

(87) PCT Pub. No.: WO2014/094246
PCT Pub. Date: Jun. 26, 2014

(65) Prior Publication Data
US 2015/0333845 A1    Nov. 19, 2015

(51) Int. Cl.
*H04L 12/26* (2006.01)
*H04B 15/00* (2006.01)
(Continued)

(52) U.S. Cl.
CPC .......... *H04B 15/00* (2013.01); *H04B 7/0413* (2013.01); *H04B 7/0417* (2013.01); *H04B 7/0632* (2013.01); *H04W 84/042* (2013.01)

(58) Field of Classification Search
None
See application file for complete search history.

(56) References Cited

U.S. PATENT DOCUMENTS

2005/0254461 A1    11/2005  Shin et al.
2006/0252436 A1*   11/2006  Tirkkonen ............... H04B 7/12
                                                  455/501
(Continued)

FOREIGN PATENT DOCUMENTS

CN    1969473 A     5/2007
CN    102130758 A   7/2011
(Continued)

OTHER PUBLICATIONS

Ericsson, 4-Branch MIMO for HSDPA, May 2011, 3GPP TSG RAN WG1 Meeting #65, R1-111763, pp. 1-17.*
(Continued)

*Primary Examiner* — Nicholas Sloms
(74) *Attorney, Agent, or Firm* — Patent Portfolio Builders, PLLC

(57) ABSTRACT

Methods and devices of controlling impact from interference from transmission to a 4-branch Multiple Input Multiple Output, MIMO, enabled User Equipment, UE, in a cellular radio system where legacy non 4-branch MIMO UEs co-exist are provided. The control involves determining an estimated Channel Quality Indicator, CQI, delay, and based on the estimated CQI delay determining if there exists a CQI under-estimation or CQI over-estimation. The control of the impact from high rank interference from transmission to the 4-branch MIMO enabled UE is based on a determined CQI under-estimation or CQI over-estimation.

11 Claims, 6 Drawing Sheets

(51) Int. Cl.
*H04B 7/0413* (2017.01)
*H04B 7/06* (2006.01)
*H04B 7/0417* (2017.01)
*H04W 84/04* (2009.01)

(56) References Cited

U.S. PATENT DOCUMENTS

| | | |
|---|---|---|
| 2008/0080641 A1 | 4/2008 | Kim |
| 2009/0154588 A1* | 6/2009 | Chen .................. H04L 1/0026 375/267 |
| 2009/0196237 A1* | 8/2009 | Jonsson ............... H04L 1/0033 370/329 |

FOREIGN PATENT DOCUMENTS

| | | |
|---|---|---|
| WO | 2012044080 A1 | 4/2012 |
| WO | 2012065278 A1 | 5/2012 |

OTHER PUBLICATIONS

Unknown, Author, "Four Branch MIMO Performance with Common Pilot Gating", 3GPP TSG-RAN WG1 #68bis, R1-121755, Jeju, South Korea, Mar. 26-30, 2012, 1-7.

Unknown, Author, "New WI: Four Branch MIMO transmission for HSDPA, Core Part", Ericsson, 3GPP TSG-RAN meeting #53, RP-111393, Fukuoka, Japan, Sep. 13-16, 2011, 1-6.

Unknown, Author, "New WI: Four Branch MIMO transmission for HSDPA, Feature Part", Ericsson, 3GPP TSG-RAN meeting #53, RP-111393, Fukuoka, Japan, Sep. 13-16, 2011, 1-5.

Unknown, Author, "New WI: Four Branch MIMO transmission for HSPDA, Performance Part", Ericsson, 3GPP TSG-RAN meeting #53, RP-111393, Fukuoka, Japan, Sep. 13-16, 2011, 1-5.

Unknown, Author, "Overall Summary of Pilot Design Schemes in Four branch MIMO System", 3GPP TSG-RAN WG1 #69, R1-122810, Prague, Czech Republic, May 21-25, 2012, 1-4.

\* cited by examiner

METHODS AND DEVICES FOR MIMO TRANSMISSION

TECHNICAL FIELD

The present disclosure relates to a method and an apparatus for MIMO transmission in a radio network.

BACKGROUND

Today's mobile communication systems are evolving rapidly. In connection with the standardization efforts in Release (Rel)) 7 for Wideband Code Division Multiple Access (WCDMA)/High Speed Packet Access (HSPA) in the third generation partnership project (3GPP), the 2-branch downlink Multiple Input Multiple Output (MIMO) was introduced for High Speed Downlink Packet Access (HSDPA). During the last years mobile operators have started to offer mobile broadband based on WCDMA/HSPA. Further, fuelled by new devices designed for data applications, the end user performance requirements are steadily increasing. Moreover, the roll out of mobile broadband has resulted in that the traffic volumes that have to be handled by the HSPA networks have grown significantly.

The growth in traffic volumes can be expected to continue. Therefore, technology that allows mobile operators to manage their spectrum resources more efficiently is of importance. One such technology that has been introduced is multi-carrier HSPA whereby carriers are pooled and handled as a common resource. Different variants of multi-carrier transmission technology have been the main features in Rel-8, Rel-9 and Rel-10. For Rel-11 new features that supplement the multi-carrier HSPA features are proposed. The new features target an increase in the (average) spectral efficiency. One such technology is multi-point transmissions for HSDPA. This is based on spatial resource pooling and it enables a User Equipment (UE) to receive data transmissions from multiple sectors and/or sites simultaneously. An aim of multi-point transmissions for HSDPA is to provide cell-edge data rate improvements.

In RAN53, four branch MIMO transmission for HSDPA was agreed as a new work item, see RP-111393, "New WI: Four Branch MIMO transmission for HSDPA". Given a fixed amount of total downlink transmission power this would:

Double the supported peak data rate so that 84 Mbps can be supported on a single downlink 5 MHz carrier.

Improve the coverage for rank-1 and rank-2 transmissions due to the higher order of beam-forming gain.

In Rel-7 MIMO, Primary Common Pilot Channel (P-CPICH) and Secondary CPICH (S-CPICH) are used for both coherent demodulation and Channel Quality Indicator/ Precoding Matrix Indicator (CQI/PMI) estimation. When using 4 transmitting branches four common pilot signals are needed. In order to obtain a good channel estimate suitable for coherent demodulation, the pilot signal power needs to be reasonably high. To solve this, several different pilot signal design options have been discussed in 3GPP as is described in e.g. R1-122810, "Overall Summary of Pilot Design Schemes in Four branch MIMO System":

Option1: Common Pilots Only

A solution would be to expand the current Rel. 7 solution to the 4 branch case, i.e. use common pilot signals also for coherent demodulation. To decrease the impact from the Common Pilot Channels (CPICHs) it was proposed to gate the non-legacy (3rd and 4th) CPICHs to only be transmitted when needed for data demodulation and periodically to allow for CQI/PMI estimation, see R1-121755, "Four branch MIMO Performance with Common Pilot Gating".

Option2: Common Pilots+Dedicated Pilots

In accordance with this option, there are still four common pilot channels but only used for CQI/PMI estimation. Besides the common pilot channels, dedicated or UE specific pilot channels are introduced for High-Speed Downlink Shared Channel (HS-DSCH) demodulation. The dedicated pilot signals are UE-specific and only need to be received by that specific user in a certain area. In this way, dedicated pilot signals can be set to have a relatively low transmit power if that is enough for that specific user. The power of the non legacy (3rd and 4th) common pilots can be reduced as CQI/PMI estimation requires less channel estimation accuracy.

Option3: Common Pilots+Scheduled Pilots

In accordance with this option, the four common pilot channels are still only used for CQI/PMI estimation. In addition, two additional 3rd&4th pilot signals are transmitted when there is 4×4 data transmission on HS-DSCH to assist data de-modulation together with the existing common pilot signals. The additional pilot signals are not UE-specific and not precoded. The power of the non legacy (3rd and 4th) common pilots can be reduced as CQI/PMI estimation requires less channel estimation accuracy.

For option 1, pilot gating was not accepted in 3GPP as it also leads to higher interference variations especially to legacy UEs, thus a decreased performance. Still similar problems will exist with co-existence of 4 branch and legacy UEs.

There is a constant demand for improving existing systems and to provide more efficient transmission in a cellular radio system. Hence, there is a need for a method and an apparatus that provide an improved transmission in a cellular radio system.

SUMMARY

It is an object of the present invention to provide an improved method and apparatus for improving transmission in a radio network, in particular a MIMO enabled cellular radio network.

This object and others are obtained by the method and apparatus as set out in the appended claims.

As has been realized by the inventors, co-existence of 4-branch MIMO UEs and legacy UEs leads to increased interference variations especially to the legacy UEs. This in turn will result in an increased CQI estimation error. More specifically, The CQI estimate can be too high for legacy UE(s) when transmitting (scheduling) in Transmission Time Intervals (TTI) mixed with 4 branch UE(s) while using CQIs estimated in TTI with only legacy UE(s). This can lead to a relative high Block Error Rate (BLER) and decreased data rates.

The CQI estimate can be too low for legacy UE(s) when transmitting (scheduling) in TTI with only legacy UE while using CQIs estimated in TTI with 4 branch UE(s). This can lead to a lower BLER than desired and a too conservative Modulation and Coding Scheme (MCS) selection, thus also decreased data rates.

This problem is further illustrated in FIG. 1. In FIG. 1 the CQI estimation error due to interference variation is illustrated for a Rel-7 legacy UE, with a CQI delay of 4 TTIs. In FIG. 1 it is seen that transmission/scheduling of a legacy UE in a TTI with 4 branch UE(s) (i.e. code-multiplexing) may be based on CQI estimated in a TTI without 4 branch UE(s).

On the other hand, transmission/scheduling of a legacy UE in a TTI without 4 branch UE(s) may be based on CQI estimated in a TTI with 4 branch UE(s). This can happen even without code multiplexing. Similar problems may occur if pilot gating is introduced. Thus, this can lead to either CQI under-estimation or CQI over-estimation, which can result in either a very high or an unnecessarily low BLER. This is illustrated in FIG. 2 and FIG. 3, respectively.

In FIG. 2 the mean value of the CQI measured at UE, Rel-7 legacy UE with a CQI delay: 4 TTIs is illustrated. As can be seen the mean CQI in pilot gated TTIs where the high rank interference, e.g., interference from the $3^{rd}$ & $4^{th}$ antennas or other antennas is not present is higher than the mean CQI in pilot non-gated TTIs where the high rank interference is not present, especially for the $2^{nd}$ stream, which implies that the interference variations do impact CQI estimation and can increase CQI estimation error.

In FIG. 3 it can be seen that there is a high BLER if there is transmission/scheduling in non-gated TTI based on CQI estimated in gated TTI. If transmission/scheduling is done in gated TTI while based on CQI estimated in non-gated TTI, there will be an unnecessarily low BLER.

Note that the problem will be more critical for the case with co-existing 4 branch and legacy UEs as 4 branch UE generates more interference than pilots when present thus introduce more interference variations. It is further to be noted pilot gating is only used as example similar problems exist in other set-ups with coexistence of 4 branch UEs and legacy UEs in case of 4 branch MIMO.

Also, today there are various types of CQI adjustment methods to compensate the CQI estimation errors. An underlying idea is in general to adjust a CQI offset based on some type of Hybrid Automatic Repeat Request (HARQ) statistics, e.g. for each user increase/decrease the CQI offset by some step if NACK/ACK was received. These HARQ based CQI adjustment methods typically need some time to converge and it is hard to follow the aforementioned estimation error as this kind of error may occur repeatedly. As a consequence of this behavior, the result is sometimes an increased CQI offset and sometimes decreased CQI offset. As the CQI adjustment cannot be performed in a fast manner, it is very likely that the adjustment cannot converge.

Another problem with CQI estimation/reporting is that the network is not aware of when the CQI is estimated in the terminal. Hence the delay between the time when the CQI is estimated and reported/used is unknown. This means that the network typically can experience problems to deduce what interference situation the UE is experiencing when the CQI was estimated. However, if this CQI delay was known, the network could compare the reported CQI with the interference situation (if a 4 branch UE was scheduled or not) when the CQI was estimated.

It is envisaged that a 4 branch MIMO capable UEs can co-exist with a legacy UEs for a long time. When 4 branch MIMO UEs are scheduled, there will be transmission and power from all the four Node B antennas of the radio base station. The transmission from the 3rd and 4th antennas will act as a pure, typically strong, interference source to a legacy UE. When legacy UEs are scheduled, there will be only transmission and power from the 1st and potentially also 2nd Node B antennas for 2 branch UEs, then the interference will not be present. This implies that the legacy UE can experience different interference depending on whether currently 4 branch UEs are scheduled. More specifically, the legacy UEs will likely experience higher interference in TTIs where 4 branch UEs are scheduled than in TTIs where 4 branch UEs are not scheduled. Due to this interference variation, the CQI/PMI estimation errors can be increased for a legacy UE. In particular, the CQI estimate can become either too aggressive or too pessimistic for legacy UE. This can in turn lead to an undesired BLER, i.e. either a too high or a too low BLER. The result is, in both scenarios, decrease data rates.

To address the above problems the CQI estimation errors of legacy UE due to co-existence of 4 branch UE and legacy UE are estimated and compensated for. This can be performed by first, preferably in the Node-B, estimating a CQI estimation delay. Based on the estimated CQI estimation delay, it is determined, preferably in the Node B, if there exists a CQI under-estimation or CQI over-estimation. Based on the determination the impact from the high rank interference is controlled. The control can in accordance with one exemplary embodiment be performed by applying a compensation of the CQI. The compensation can for example be performed by adding a CQI compensation factor upon the common CQI adjustment offset.

In another embodiment, the determination that there exists a CQI under-estimation or CQI over-estimation is used to control the scheduling priority pattern so that the occurrence of interference variations is reduced or even avoided.

Different embodiments of the invention may be based on one or more of the above aspects. Embodiments of the invention include different methods in Node-B.

In accordance with one embodiment a method of controlling impact from interference from transmission to a 4-branch MIMO enabled UE in a cellular radio system is provided. The cellular radio system also comprises legacy non 4-branch MIMO UEs co-existing with the 4-branch MIMO enabled UE. In accordance with the method an estimated CQI delay is determined. Based on the estimated CQI delay it is determined if there exist a CQI under-estimation or CQI over-estimation. The impact from high rank interference, in particular interference from the 3rd and 4th antennas, from transmission to the 4-branch MIMO enabled UE is then controlled based on a determined CQI under-estimation or CQI over-estimation. Hereby it is possible to reduce the interference in the cellular radio system for the UEs therein.

In accordance with one embodiment the control of the impact from the high rank interference from transmission to the 4-branch MIMO enabled UE is performed by applying a compensation factor to the CQI.

In accordance with one embodiment one set of CQI compensation factors is applied for legacy 2-branch MIMO UEs and another set of CQI compensation factors is applied for legacy non-MIMO UEs.

In accordance with one embodiment the control of the impact from the high rank interference from transmission to the 4-branch MIMO enabled UE is performed by controlling the scheduling priority pattern.

It is to be noted that the problem related to the CQI error can exist when there is a mix of UEs supporting different number of antennas. This will not only be the case with 4 antenna UEs co-existing with 2 (and 1) antenna UEs. For instance if in the future there will be 8 antenna UEs there will be similar problems between 8-branch MIMO enabled UEs and the legacy 4-branch UEs. The term high rank interference refers to interference from higher order antennas. In the case of a 4 branch MIMO enabled UE the high rank interference will be the interference from the $3^{rd}$ and $4^{th}$ antenna.

The disclosure also extends to devices including a radio base station Node B for use in a cellular radio system adapted to perform the methods as described herein. The devices can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

Figure 4:
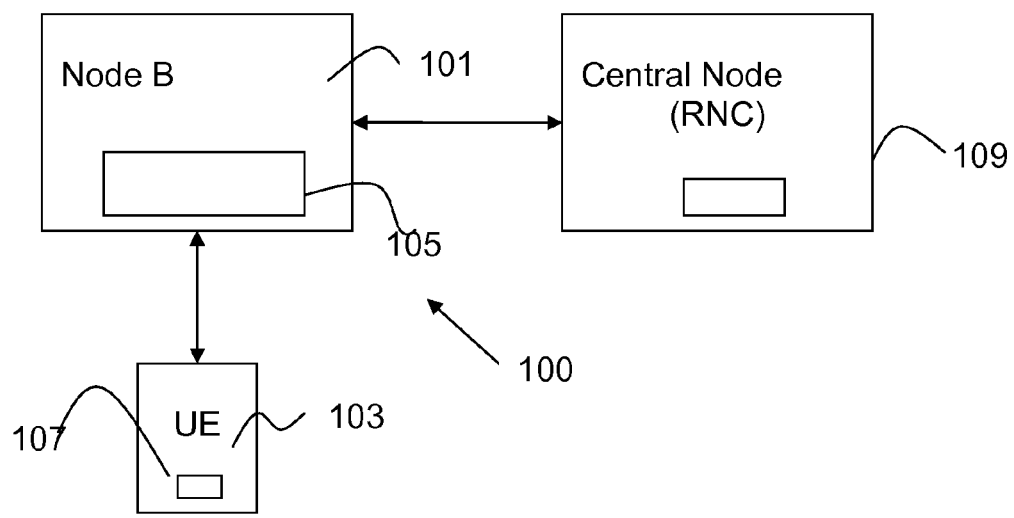
FIG. 4 is a general view of a cellular radio system.

In FIG. 4 a general view of a cellular radio system 100 is depicted. The system can for example be a WCDMA/HSPA system adapted for data transmission using Multiple Input Multiple Output (MIMO). The system 100 comprises a number of radio base stations 101, here denoted NodeBs. The radio base stations 101 are connected to a control node denoted Radio Network controller (RNC) 109. Mobile stations 103, here represented by a single unit and denoted User Equipment (UE), that are present in a geographical area covered by the radio base station can connect to the radio base station over an air-interface. The radio base station 101 further comprises a module 105 for performing different operations of the radio base station 101. The module 105 can for example be implemented using a microcontroller operating on a set of computer software instructions stored on a memory in the module 105. The UEs 103 in turn comprises a module 107 adapted to perform operations of the UEs 103. The module 107 can for example be implemented using a microcontroller operating on a set of computer software instructions stored on a memory in the module 107. The UEs can be both legacy UEs with 2 transmit antennas or UEs having 4 transmit antennas. Also legacy UEs not supporting MIMO can be present in the area covered by the NodeB. The NodeB supports transmission to and from all the UEs in the area that it covers.

Figure 5:
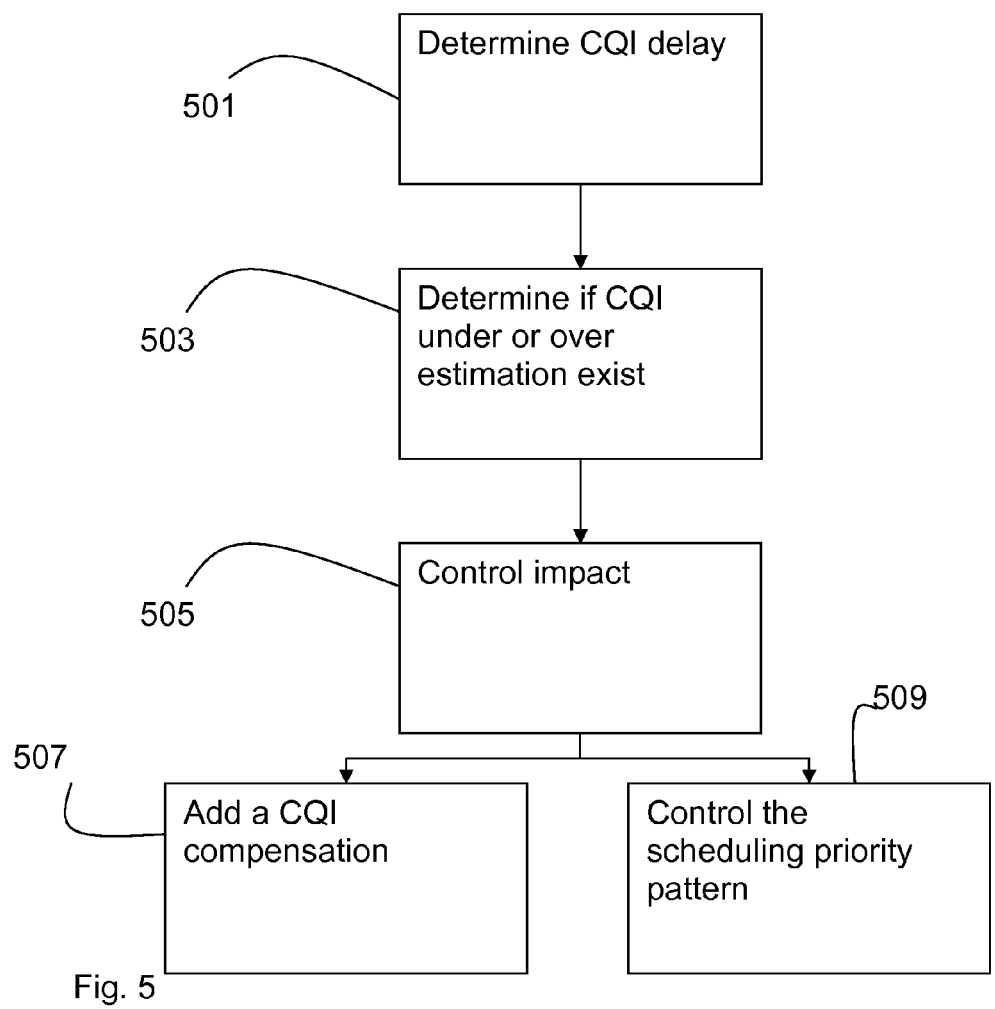
FIG. 5 is a flowchart illustrating some procedural steps performed controlling impact from co-existing 4 branch UEs.

In the following, some exemplary embodiments are described that are aimed at reducing the problems of CQI estimation errors in a legacy UE due to co-existence of a 4 branch UE. In FIG. 5 a flow chart illustrating some steps performed is illustrated. The steps performed in FIG. 5 can for example be performed in a NodeB. First, in a step 501 an estimated CQI delay is determined. Based on the estimated CQI delay it is determined, if there exists a CQI under-estimation or CQI over-estimation in a step 503.

Based on the determination in step 503, the impact from the high rank interference such as interference from the $3^{rd}$ and $4^{th}$ antennas is controlled in a step 505. The control can in accordance with one exemplary embodiment be performed by applying a compensation of the CQI as indicated in step 507. The compensation can for example be performed by adding a CQI compensation factor upon the common CQI adjustment offset.

In an alternative embodiment, control can be performed by controlling the scheduling priority pattern so that the occurrence of interference variations is reduced or even avoided in a step 509.

CQI Delay Estimation

Figure 1:
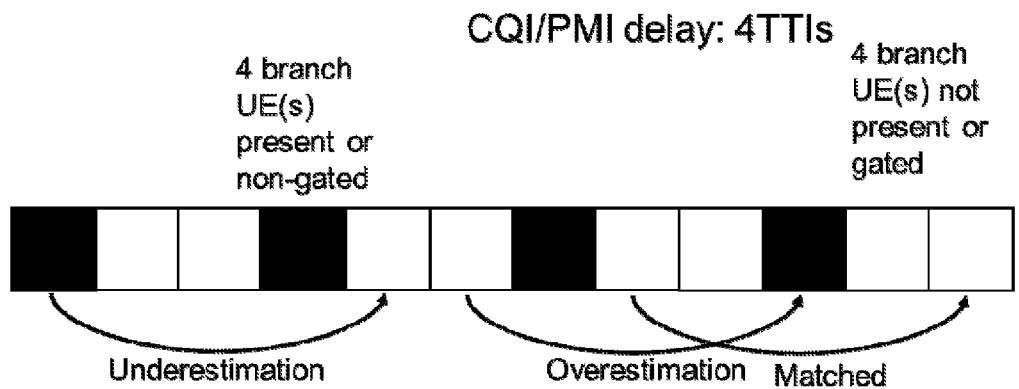
FIG. 1 depicts a CQI estimation error.
Figure 2:
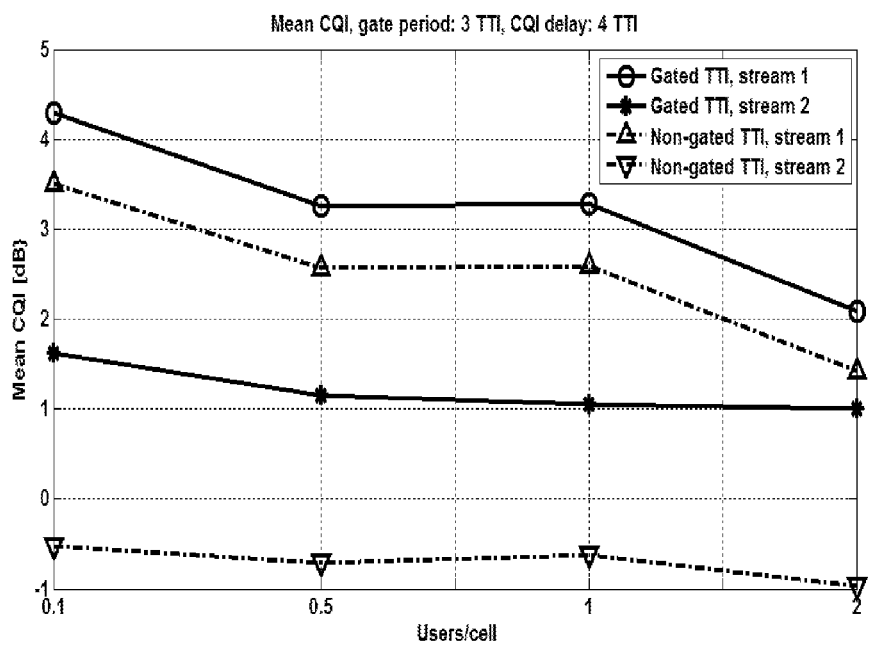
FIGS. 2 and 3 depict CQI under-estimation or CQI over-estimation, respectively.
Figure 3:
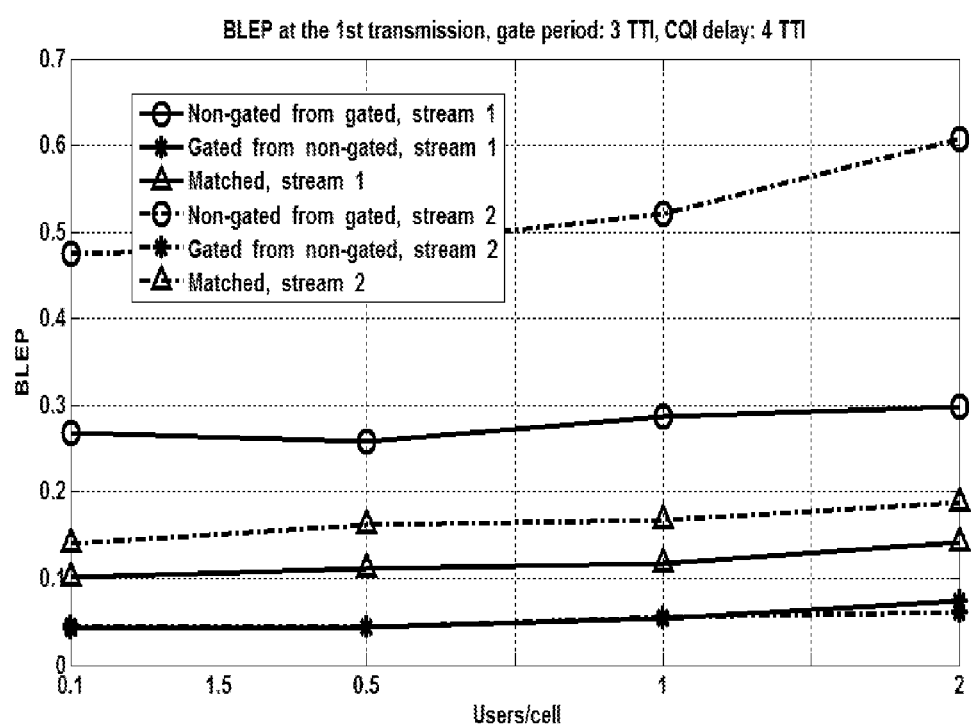

As shown in FIG. 2 there is a clear difference between mean CQI measured in TTIs without the high rank interference and the mean CQI measured in TTIs with the interference from the $3^{rd}$ & $4^{th}$ antennas. On the other hand, node-B knows whether the interference is present or not in each TTI. Using these properties the CQI delay can be well estimated.

Figure 6:
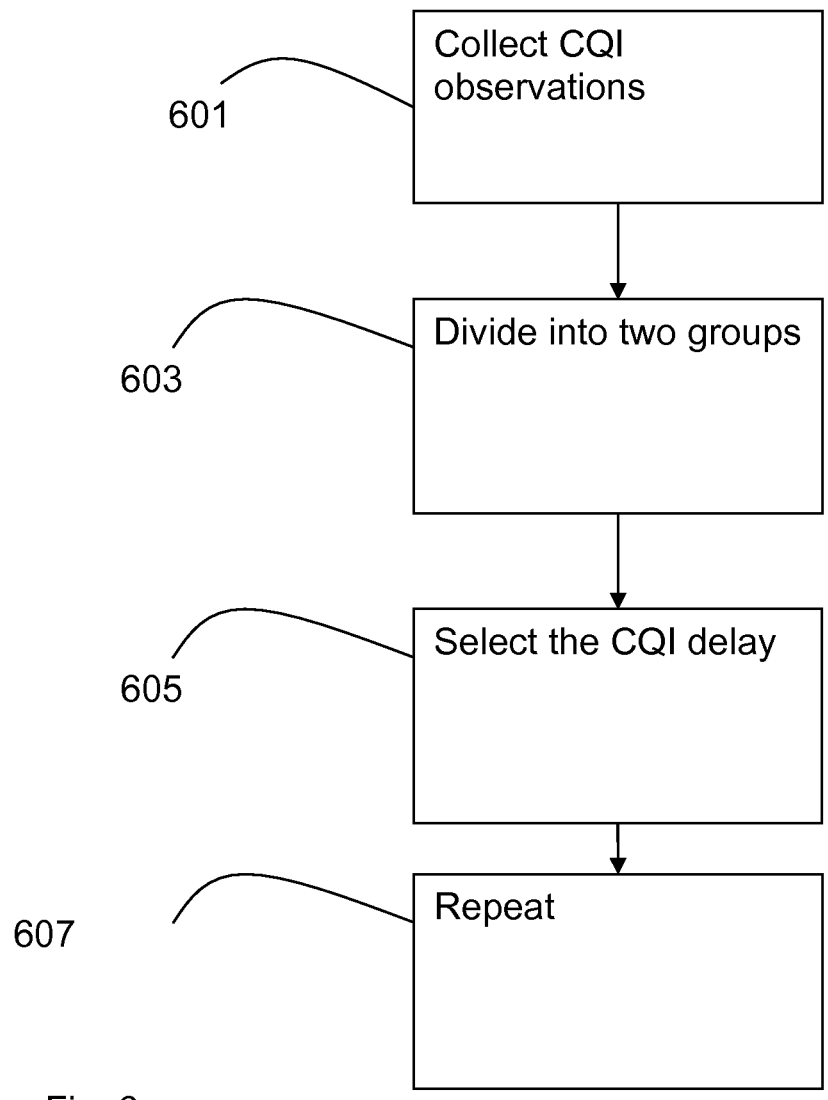
FIG. 6 is a flowchart illustrating some procedural steps performed when estimating a CQI delay.

In FIG. 6 an exemplary implementation is outlined as a flowchart. First in a step 601 CQI observations in sufficient number of TTIs at node-B are collected including CQIs estimated in TTIs both with and without the high rank interference.

Figure 7:
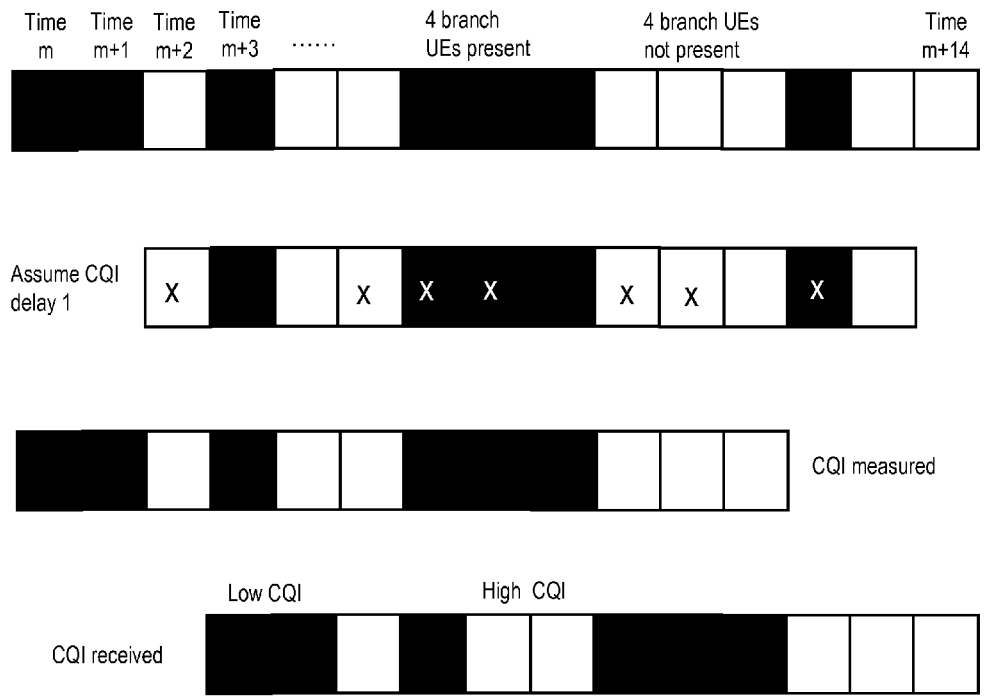
FIG. 7 illustrates CQI delay speculation.

Assuming a collection of n CQI observations and the CQI reports are received in (m+k)th TTI to (m+k+n−1):th TTI, where k is the CQI estimation delay, i.e. the CQIs are measured in m:th TTI to (m+n−1):th TTI. FIG. 7 shows an example where n equals 12 and k equals 3. The Node-B does not know the CQI estimation delay (k) as this depends on UE implementation but it knows whether or not 4 branch UE(s) is present in a TTI (filled with black color) where high rank interference exists. With this information the CQI delay can be determined as follows.

The received CQI reports are divided into two groups in a step 603 so that there is an evident difference between the groups while smaller difference within the group. One way of doing this for this is to sort the n CQIs and calculate the difference between each adjacent CQIs, resulting in n−1 CQI differences, if there exists one CQI difference, e.g. the $i^{th}$ CQI difference, that is distinctly larger than the other ones, the CQI statistics can be divided into two groups, one group contains the $1^{st}$ to the $i^{th}$ CQI statistics (i.e. high CQI group), the other group contains the $(i+1)^{th}$ to $n^{th}$ CQI statistics (low CQI group). Moreover, the following static measures can be obtained from each group:

Mean and variations of each group

The pattern in terms of "high CQI"/"low CQI"

Assuming CQI estimation delay is x, then the CQIs should be measured in (m+k−x)th TTI to (m+k−x+n−1)th TTI. It is to be noted that k is still unknown. Also it can be speculated if CQIs are measured in TTIs with or without 4 branch UEs. The CQIs measured in TTIs with 4 branch UEs should belong to low CQI group, and the CQIs measured in TTIs without 4 branch UEs should then belong to high CQI group. Correspondingly the following statistics can be speculated:

Mean and variations of each speculated group

The speculated pattern in terms of "high CQI"/"low CQI"

If the speculated CQI delay is not the actual CQI delay, the difference in mean value between the high CQI and low CQI group will be distinctly smaller than it should be while the variation of each group will be distinctly higher than it should be. The pattern in terms of "high CQI"/"low CQI" will also not match that obtained based on the received CQI reports.

FIG. 7 gives one example where CQI delay is speculated to be 1 but is actually 3. The grid marked with "x" means the CQI is deemed to be in high/low CQI group bit is actually not. Clearly in both speculated high CQI group and low CQI group the number of the actual high CQIs is close to that of the actual low CQIs, thus the mean value of two speculated groups will be similar while the variation of the groups will be larger than its actual value.

In a step 605 different CQI delay values are speculated and the value satisfying some criteria is selected as the CQI delay. For example the following criteria can be used:

The value that gives the largest difference in mean value between the speculated high CQI and the speculated low CQI group Or further, the value that gives the smallest variation of speculated high CQI or the speculated low CQI group Or further, The value where the speculated pattern in terms of "high CQI"/"low CQI" is the same to that obtained base on the received CQI reports For the first two of the example criteria above, the processing of the received CQI reports (i.e. to identify high and low CQI group and the subsequent operations) is not needed.

The CQI delay estimation procedure can be repeated several rounds to increase reliability in a step 607. It is to be noted that all the criteria can be used jointly or individually.

In accordance with some embodiments, the CQI delay estimation procedure is (re)run for a cell if:

There are legacy UEs active in that cell, and any one of following conditions is fulfilled The CQI delay is not estimated yet, or Periodically (re)run the procedure or ordered by the network Also, in accordance with some embodiments, the CQI delay estimation procedure can be stopped for a cell if:

There are no legacy UEs active in that cell, or

The CQI delay is just estimated.

Control of the Impact from the High Rank Interference

There are different ways to control the impact from the interference generated by transmission to the 4 branch UEs as described below. One way is via improvement in scheduling. Another way is via improvement in CQI compensation.

Scheduling Priority Pattern Adaptation

Figure 8:
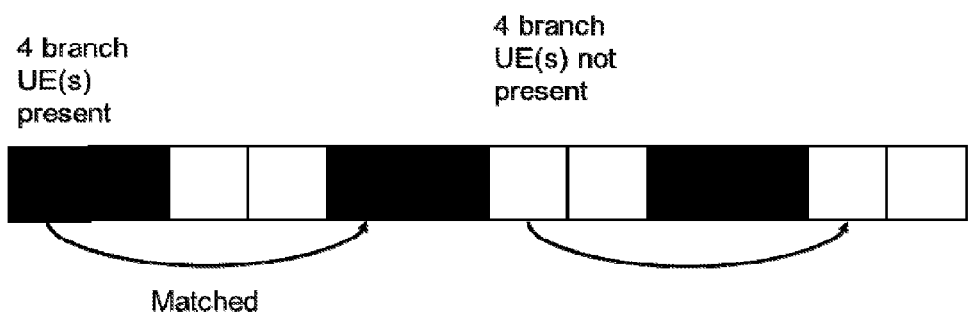
FIG. 8 illustrates match of scheduling pattern and CQI delay.

Though 4 branch UEs may cause interference variation to the legacy UEs, this may not always impact the CQI/PMI estimation. FIG. 8 gives an example. In FIG. 8 it can be seen that transmission/scheduling in TTI with/without 4 branch UE(s) are always also based on CQI estimated in TTI with/without 4 branch UE(s), thus the interference variation does not impact the CQI estimation of the legacy UE. This is typically the case if there is a regular scheduling pattern which repeats with a period equals to the CQI estimation delay. Here the scheduling pattern is defined in terms of "4 branch UEs present" and "4 branch UEs not present, i.e. only legacy UEs". Accordingly, if 4 branch UEs co-exist with the legacy UEs, a Node-B can take the CQI estimation delay, which is estimated according to the above, and the UE category as input when determining the scheduling priority. In accordance with one embodiment the following measures can be taken A scheduling pattern can be introduced with a length equals the CQI estimation delay. The pattern thus contains n TTIs if the CQI estimation delay is n.

Each TTI is either a "4 branch UE prioritized TTI" or a "legacy UE prioritized TTI"

4 branch UE has higher (or increased) scheduling priority in "4 branch UE prioritized TTI"

Legacy UE has higher (or increased) scheduling priority in "legacy UE prioritized TTI"

The above measures can be combined. Also as an extension the following measure may optionally be taken.

The ratio of 4 branch UE prioritized TTIs or legacy UE prioritized TTIs can be dynamically adapted based on e.g. traffic load from the 4 branch UEs and the legacy UEs In this way the impact of interference variation to the legacy UEs can be decreased or avoided.

Compensation of CQI Estimation Error

Knowing the CQI estimation delay, it is possible to determine whether the CQI used for transmission/scheduling is based on CQI measured in a TTI with or without the 4 branch UE(s), i.e. with or without the high rank interference, and whether CQI overestimation/underestimation exists or not, e.g. whether or not transmission/scheduling and the corresponding CQI measurement are in the same type of TTI defined in terms of with or without 4 branch UEs. In addition to the CQI offset adjusted based on ACK/NACK feedback, additional new sets of CQI compensation factors can be introduced if overestimation/underestimation exists. In particular one set CQI compensation factors for legacy 2-branch MIMO UEs and one CQI compensation factor set for legacy non-MIMO UEs. Both sets can have two compensation factors, one for TTIs with CQI overestimation and one for TTIs with CQI underestimation, respectively. In FIG. 2 it can be seen that for legacy 2-branch MIMO UEs the difference between the mean CQI with high rank interference and without high rank interference is larger for the 2nd stream. In accordance with one embodiment the following steps can be performed: Suppose the difference is d1 and d2 for the 1st and 2nd stream, in addition to the existing CQI offset the following compensation is added based upon the reported CQI:

For the TTIs with CQI overestimation (which are always the TTIs transmitted/scheduled with 4 branch UEs by code multiplexing) add d1 and d2 to the most recently reported CQIs for the 1st and 2nd stream (if there is stream 2 transmission) before using them in scheduling and link adaptation.

For the TTIs with CQI underestimation add −d1 and −d2 to the most recently reported CQIs for the 1st and 2nd stream (if there is stream 2 transmissions) before using them in scheduling and link adaptation.

For legacy non-MIMO UEs there is always one stream and the impact of the high rank interference can be different than that on legacy 2-branch MIMO UEs. Assume that the difference between the CQI in TTIs with and without the high rank interference is d3, for legacy non-MIMO UEs d3 can be added to the most recently reported CQIs in a similar way as for legacy 2-branch MIMO UEs as described above.

d1, d2 and d3, which can be denoted the CQI compensation factors, can be either pre-configured based on simulations or statistics got from real network, or on-line updated. One way of on-line update is that we can monitor the ACK/NACK ratio over a certain time for the TTIs with CQI overestimation, the TTIs with CQI underestimation and potentially also the TTIs not impacted by high rank interference variation. If the differences between the ACK/NACK ratios exceed a certain threshold, which means that the CQI adjustment process does not converge, the following steps can be performed for legacy 2-branch MIMO UEs:

If the ACK/NACK ratio for the TTIs with CQI overestimation is lower/higher than the ACK/NACK ratio for the TTIs with CQI underestimation and/or the TTIs not impacted by high rank interference variation (which implies that the compensation is insufficient), increase d1 and/or d2 for a certain step If the ACK/NACK ratio for the TTIs with CQI overestimation is higher/lower than the ACK/NACK ratio for the TTIs with CQI underestimation and/or the TTIs not impacted by high rank interference variation (which implies that the compensation is excessive), decrease d1 and/or d2 for another certain step Otherwise d1 and d2 are kept unchanged. For legacy non-MIMO UEs d3 can be handled in a corresponding manner as Rel-7 MIMO UEs.

Using the methods and devices as described herein can mitigate the negative impact of high rank interference thereby improving throughput and Quality of Service (QoS). In addition there is a decreased performance variation. Further the methods can be implemented without significant impact in the cellular radio system and without any impact on the UEs.

The invention claimed is:

1. A method of controlling impact from high-rank interference from transmission to a 4-branch Multiple Input Multiple Output (MIMO) enabled User Equipment (UE) in a cellular radio system where legacy non-4-branch MIMO UEs co-exist, the method comprising:
determining, by a radio base station in the cellular radio system, an estimated Channel Quality Indicator (CQI) delay;
based on the estimated CQI delay, determining, by the radio base station, if there exists a CQI under-estimation or a CQI over-estimation; and
controlling, by the radio base station, the impact from the high-rank interference from transmission to the 4-branch MIMO enabled UE, based on the determined CQI under-estimation or the determined CQI over-estimation, by controlling a scheduling priority pattern, wherein a length of the scheduling priority pattern equals the estimated CQI delay, and further wherein controlling the scheduling priority pattern comprises prioritizing each Transmission Time Interval (TTI) as either a 4-branch MIMO enabled UE prioritized TTI or a legacy non-4-branch MIMO UE prioritized TTI, and dynamically adapting a ratio of the 4-branch MIMO enabled UE prioritized TTIs and the legacy non-4-branch MIMO UE prioritized TTIs based on traffic load from the 4-branch MIMO enabled UE and a legacy non-4-branch MIMO UE.

2. The method of claim 1, wherein controlling the impact from the high-rank interference from transmission to the 4-branch MIMO enabled UE is performed by applying a compensation factor to the determined CQI under-estimation or the determined CQI over-estmation.

3. The method of claim 2, wherein one set of CQI compensation factors is applied for legacy 2-branch MIMO UEs and another set of CQI compensation factors is applied for legacy non-MIMO UEs.

4. The method of claim 1, wherein the high-rank interference is interference from both of a $3^{rd}$ antenna and a $4^{th}$ antenna.

5. The method of claim 1, wherein the cellular radio system is a Wideband Code Division Multiple Access (WCDMA) system or a High Speed Packet Access (HSPA) system.

6. A radio base station adapted to control impact from high-rank interference from transmission to a 4-branch Multiple Input Multiple Output (MIMO) enabled User Equipment (UE) in a cellular radio system where legacy non 4-branch MIMO UEs co-exist, the radio base station comprising:
a controller that:
determines an estimated Channel Quality Indicator (CQI) delay;
determines if there exists a CQI under-estimation or a CQI over-estimation, based on the estimated CQI delay; and
controls the impact from the high-rank interference from transmission to the 4-branch MIMO enabled UE, based on the determined CQI under-estimation or the determined CQI over-estimation, by controlling a scheduling priority pattern, wherein a length of the scheduling priority pattern equals the estimated CQI delay, and further wherein controlling the scheduling priority pattern comprises prioritizing each Transmission Time Interval (TTI) as either a 4-branch MIMO enabled UE prioritized TTI or a legacy non-4-branch MIMO UE prioritized TTI, and dynamically adapting a ratio of the 4-branch MIMO enabled UE prioritized TTIs and the legacy non-4-branch MIMO UE prioritized TTIs based on traffic load from the 4-branch MIMO enabled UE and a legacy non-4-branch MIMO UE.

7. The radio base station according to claim 6, wherein the radio base station is adapted to control the impact from the high-rank interference from transmission to the 4-branch MIMO enabled UE by applying a compensation factor to the determined CQI under-estimation or the determined CQI over-estimation.

8. The radio base station according to claim 7, wherein the radio base station is adapted to apply one set of CQI compensation factors for legacy 2-branch MIMO UEs and further adapted to apply another set of CQI compensation factors for legacy non-MIMO UEs.

9. The radio base station according to claim 6, wherein the high-rank interference is an interference from both of a $3^{rd}$ antenna and a $4^{th}$ antenna.

10. The radio base station according to claim 6, wherein the cellular radio system is a Wideband Code Division Multiple Access (WCDMA) system or a High Speed Packet Access (HSPA) system.

11. The method of claim 1, wherein the 4-branch MIMO enabled UE has a higher scheduling priority in the 4-branch MIMO enabled UE prioritized TTI than the legacy non-4-branch MIMO UE and the legacy non-4-branch MIMO UE has a higher scheduling priority in the legacy non-4-branch MIMO UE prioritized TTI than the 4-branch MIMO enabled UE.

* * * * *